A. M. SCHALL.
GUMMING MACHINE.
APPLICATION FILED SEPT. 30, 1913.
1,191,537.
Patented July 18, 1916.
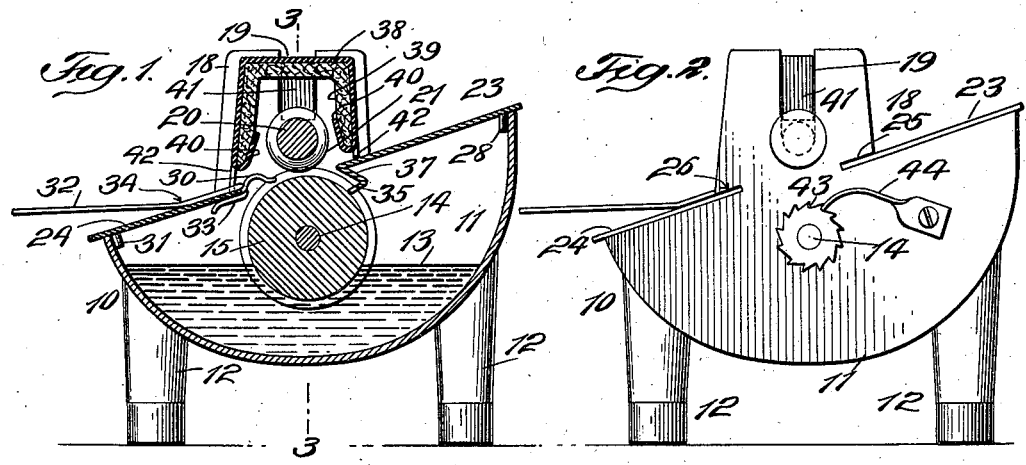
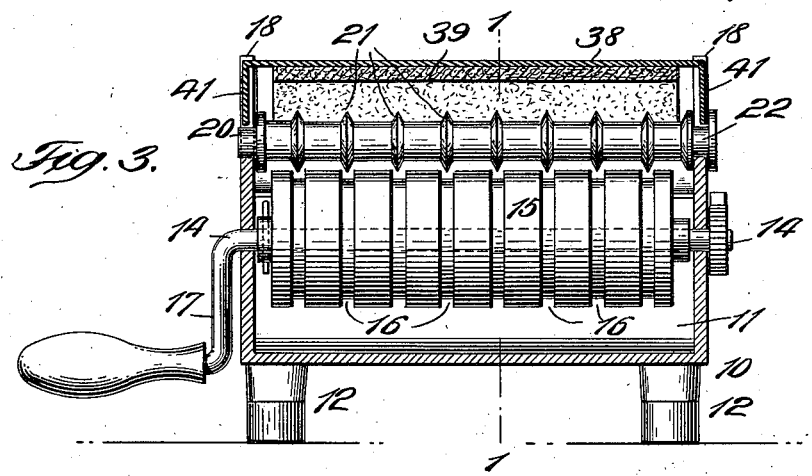
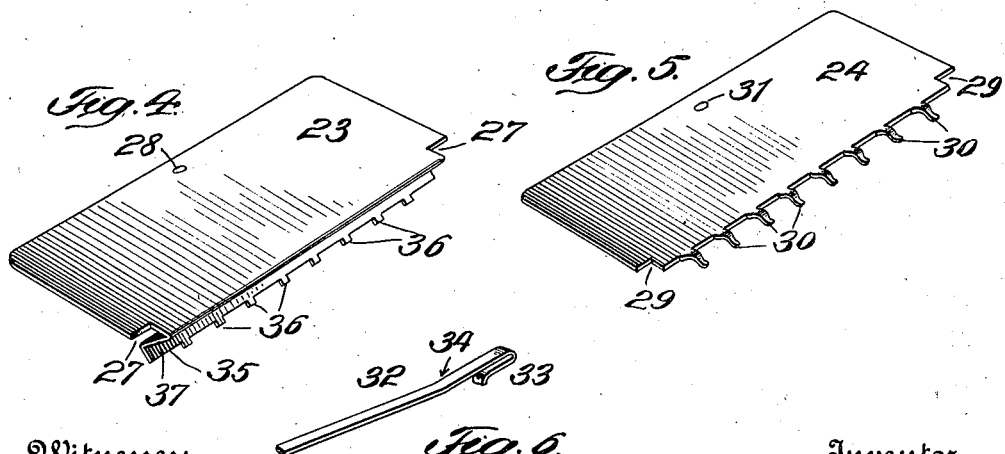
Witnesses:
Inventor
Albert M. Schall,
By his Attorney,
Charles C. Gill.

UNITED STATES PATENT OFFICE.

ALBERT M. SCHALL, OF BROOKLYN, NEW YORK.

GUMMING-MACHINE.

1,191,537.  Specification of Letters Patent.  Patented July 18, 1916.

Application filed September 30, 1913. Serial No. 792,558.

*To all whom it may concern:*

Be it known that I, ALBERT M. SCHALL, a citizen of the United States, and a resident of Brooklyn, in the county of Kings and State of New York, have invented certain new and useful Improvements in Gumming-Machines, of which the following is a specification.

The invention pertains more particularly to machines for applying gum or paste to one side of labels, sheets, strips and the like, and the object of the invention is to provide a simplified machine of this character capable of efficient operation and at the same time to obviate the rapid drying of the gum in the machine and on the mechanism thereof. One great source of trouble in the use of machines of the class to which my invention pertains, has been the fact that the gum on the gumming roller and parts connected and coöperating therewith rapidly dries during the temporary non-use of the machines, as during the night, and renders the machines inoperative until cleaned. The hardening of the gum on the pasting roller and its coöperating parts frequently results in the straining of the machine by employees attempting to operate the same without first ascertaining that the gum has become hardened or without cleaning the machine.

The machine of my invention comprises a receptacle for holding the gum or paste, a feed-roller preferably of disk construction, gumming-roller adapted to be rotated while partly submerged in the paste or gum, a scraper for removing surplus paste or gum from the upper advancing surface of the gumming roller, a downwardly inclined removable feed-table for directing the labels and the like to the gumming-roller and below the feed-roller, means for receiving the gummed labels from the gumming roller and a removable casing in the general outline of an inverted trough set over the feed and gumming rollers and spanning the space between the feed and receiving tables of the machine, said casing containing felt or other porous substance capable of holding water and of remaining moist for a considerable period. I have found that when a casing such as I have described is employed over the gumming and feed rollers, the moisture confined therein serves to prevent the hardening of the paste or gum on the gumming roller and its coöperating parts and also serves to aid in preventing the hardening of the gum in the main receptacle of the machine. The aforesaid casing is removable from the machine and when the felt or other porous substance carried therein becomes unduly dry, it may be re-moistened by dipping the casing in water, or otherwise.

The invention will be fully understood from the detailed description hereinafter presented, reference being had to the accompanying drawings, in which:

Figure 1 is a vertical section, on the dotted line 1—1 of Fig. 3, through a gumming machine constructed in accordance with and embodying my invention; Fig. 2 is an end view of the same; Fig. 3 is a central vertical section through the same, on the dotted line 3—3 of Fig. 1; Fig. 4 is a detached perspective view of the feed-table and scraper; Fig. 5 is a detached perspective view of the cover plate or table-section at the delivery side of the machine, and Fig. 6 is a detached perspective view of one of the fingers which may be applied to said cover plate for receiving the gummed labels preparatory to their removal from the machine.

In the drawings, 10 designates the general frame of the machine comprising a semi-cylindrical receptacle 11 and supporting legs 12, the receptacle being provided to hold the gum or paste 13 to be applied to the labels and the like.

In the ends of the receptacle 11 I mount a shaft 14 for a pasting or gumming roller 15, which is not unusual in construction but preferably contains a series of annular grooves 16. The roller 15 may be rotated by hand from a crank 17 or may, as is obvious, be rotated by power to be applied thereto. The receptacle 11 has upwardly extending end portions 18 vertically slotted, as at 19, to receive at the lower ends of the slots and afford bearings for the reduced end portions of the feed-roller 20 which will preferably have annular ribs or disks 21 in the vertical plane of the annular grooves 16 in the gumming roller 15. The feed-roller 20 is directly over the gumming roller 15 and in close relation thereto but without touching the same, it being the purpose that no gum shall transfer from the gumming roller to the feed-roller. One end of the feed roller 20 is formed with an annular groove 22 which receives the adjacent edges of one of the ends 18 along the slot 19 therein, as shown in Fig. 3, and by reason of the end walls of said groove prevents sliding motion of the feed-roller 20. The feed-roller 20 is free to rotate and receives its rotary movement from the friction of the labels or the like which may be fed below it to the gumming roller 15, it being the intention that owing to the thickness of the labels the upper surface of the same will engage the edges of the ribs 21 on the roller 20 and effect the rotation of said roller during the travel of the labels through the machine.

The receptacle 11 while semi-cylindrical in outline is disposed with one edge higher than the other edge, as shown in Fig. 1, whereby the top of the receptacle becomes inclined downwardly and rearwardly, said top being about on a line between the adjacent surfaces of the gumming roller 15 and feed-roller 20. Over the top of the receptacle 11 there is at the front of the gumming roller 15 a downwardly and inwardly inclined feed-table 23 and at the delivery side of said gumming roller a cover or table section 24, both being of sheet metal and detachable from the machine. The end portions 18 of the receptacle 11 have undercut recesses 25, 26 and the lower inner edge of the feed table 23 is recessed at its corners, as at 27 (Fig. 4), to pass within the said recesses 25 while allowing an intermediate portion of the lower inner part of the feed-table to pass between the vertical end portions 18 of the receptacle and approach close to the roller 15. Near its upper edge the feed-table 23 is provided with a pin 28 which, when the lower edge of the feed-table has been pressed to position, will pass into the receptacle 11 in engagement with the inner upper edge thereof and serve to aid in detachably holding the feed-table, which is a cover plate, upon the receptacle. The cover or table section 24 is recessed, as at 29, at the corners of its upper edge so that the upper edge portions of said section 24 may move upwardly into the recesses 26 cut in the end portions 18 of the receptacle and allow an intermediate part of the upper edge of the section 24 to pass between the portions 18 of the receptacle and closely approach the gumming roller 15. The cover or table section 25 is formed along its upper edge with a series of curved fingers 30 which do not touch but are in close relation at their outer ends to the gumming roller, and thence curve upwardly and rearwardly and then downwardly to the edge of the table section 24, as more clearly illustrated in Fig. 1.

Adjacent to the middle portion of its lower edge the cover or table section 24 is provided with a pin 31 which, when the upper edge portions of the section have reached their proper position over the receptacle, may upon the downward movement of the then lower portion of the section 24, be caused to enter the receptacle in engagement with the upper inner edge thereof, as shown in Fig. 1, and serve to aid in detachably retaining said section in position over the delivery side of the said receptacle.

Upon the cover-plate or table-section 24 may be applied any convenient number of bars 32 (Fig. 6) which are of metal and have a hook-shaped forward end 33 adapted to be closely slipped over the upper edge of the said section 24. The forward portions of the bars 32 will lie flat against the table section 24 and thence said bars 32 by reason of a bend at 34 therein will extend rearwardly at an angle to the surface of the table section 24. The fingers 30 on the table section 24 deflect the labels and the like from the gumming roller 15 and direct them to the bars 32, which will receive the gummed labels and permit them to be conveniently lifted therefrom by hand. For relatively small labels only two or three of the bars 32 will be necessary.

The lower edge of the feed table or cover section 23 has formed on it a scraper 35 provided with projecting tongues 36 spaced apart correspondingly with the spacing of the grooves 16 in the gumming roller 15. It is my purpose that the edge of the scraper 35 shall engage the surface of the gumming roller 15 continuously from one end of said roller to the other, both between and within the annular grooves 16, one scraper thus being sufficient for the gumming roller, and this scraper I locate, as shown in Fig. 1, close to the inner end of the feed table 23 and against that portion of the gumming roller immediately advancing to engage the labels fed to the machine. The scraper 35 will preferably be integral with the feed table 23, the metal from which said table is made being bent downwardly and inwardly as at 37 and then forwardly to create the scraper 35.

Superimposed above the feed roller 20 and gumming roller 15 and spanning the space between the table sections 23, 24 is a sheet metal casing 38 which is in the outline of an elongated inverted trough having a top and front and rear downwardly diverging sides and containing a thick lining of felt or other porous water-holding material 39, this lining extending along the inner side and top walls of the casing and being held in position by flanges 40 turned inwardly and upwardly from the lower edges of the front and rear sides of the casing. The casing 38 fits between the vertical extensions 18 of the receptacle 11 and at its ends is formed with vertical sections 41 to slide into and substantially close the slots 19 in said extensions above the ends of the feed roller 20. At the ends of the casing 38 the metal of the front and rear sides of the casing extends downwardly below the flanges 40 holding the felt and constitutes short feet 42 engaging the table sections 23, 24 and supporting the casing 38 above the same, the feet engaging the table section 23 being shorter than those engaging the table sections 24, and the purpose in both cases being to leave only sufficient room below the flanges 40 of the casing to permit the entrance of the labels to the gumming roller 15 and their egress therefrom over the fingers 30 and upon the bars 32. The casing 38 is intended to be a substantially closed casing excluding as far as possible the outside air therefrom and creating therein a chamber inclosing damp or humidified air. The casing 38 is removable from the receptacle 11 and in the construction presented said casing is centered upon said receptacle by the engagement of the sections 41 thereof with the edges of the slots in the end extensions 18. In the employment of the casing 38 the felt or equivalent lining 39 will be wet with water and caused to hold as much water as may be possible without dripping, and the lining 39 will closely engage the interior walls of the casing 38, this helping to prevent unduly rapid drying of the lining. The flanges 40 not only serve to hold the lining 39 in position, but also to aid in preventing drip therefrom. I do not limit my invention to the details of the casing 38, since the main purpose is to provide over the gumming and feed rolls and particularly over the gumming roll and its coöperating parts, a chamber having means for maintaining the air therein in a greatly humidified state or adequate to prevent the unduly rapid drying of the gum on the roller 15 and its coöperating parts during the non-use of the machine, as during the night. I have found that a casing 38 of the character shown in the drawings and lined with felt will, after the felt has been soaked in water, maintain a humidified atmosphere over the gumming roller sufficient to prevent the hardening of the gum thereon for several days. The presence of the casing 38 containing humidified air spanning the space between the table sections 23, 24 also serves to retard evaporation from the receptacle 11.

The manner of employing the machine hereinbefore described will be readily understood without detailed explanation. In applying the gum 13 to the receptacle 11, the casing 38 and one of the table sections will be removed and the gum poured into the receptacle, and thereupon the table section will be restored to position and the casing 38 with wet felt 39 therein will be placed over the feed roller 20 and span the space between the facing edges of the table sections 23, 24. The labels to be gummed will be fed down the table section 23 and below the forward edge of the casing 38 to the gumming roller 15 and feed roller 20 and will be carried through the machine and stripped from the gumming roller by the fingers 30 on the table section 24, the labels finally passing upon the bars 32 and being removed by hand. During the use of the machine the surplus paste will be scraped from the roller 15 by the scraper 35. The roller 15 will be prevented from turning backwardly by any suitable means, such as a ratchet 43 on the end of the shaft 14 and a coöperating pawl 44 secured to the receptacle 11. Practical demonstration has shown that the machine hereinbefore described is highly efficient and convenient in use and said machine is of simple construction and may be marketed at a reasonable price. The casing 38 containing the wet lining 39 affords, as hereinbefore described, a humidified atmosphere about the gumming and feed rollers and prevents the unduly rapid hardening of the gum on the roller 15 and its coöperating parts during the non-use of the machine.

It is of advantage that the feed roller does not contact with the gumming roller, and in the construction presented by me the annular ribs or disks of the feed roller may enter slightly within the annular grooves of the gumming roller and insure the proper gumming of the labels without said annular ribs or disks touching the gumming roller.

What I claim as my invention and desire to secure by Letters Patent, is:

1. In a machine of the class described, a receptacle for the liquid gum or paste, a gumming-roller mounted in the receptacle, a feed-roller coöperating therewith, and a casing containing a moisture-holding substance mounted over said rollers for preventing the undue hardening of the gum or paste.

2. In a machine of the class described, a receptacle for the liquid gum or paste having front and rear cover-plates separated from each other at their inner edges, a gumming-roller mounted in the receptacle and projecting into the space between the inner edges of said plates and a humidifier mounted over said roller and spanning said space.

3. In a machine of the class described, a receptacle for the liquid gum or paste having front and rear cover-plates separated from each other at their inner edges, a gumming-roller mounted in the receptacle and projecting into the space between the inner edges of said plates and a humidifier mounted over said roller and spanning said space, said humidifier consisting of a removable casing open at its lower side and containing a water-holding substance.

4. In a machine of the class described, a receptacle for the liquid gum or paste having front and rear cover-plates separated from each other at their inner edges, a gumming-roller mounted in the receptacle and projecting into the space between the inner edges of said plates and a humidifier mounted over said roller and spanning said space, said humidifier consisting of a removable sheet metal casing open at its lower side and having a lining of water-holding substance, and the front and rear lower edges of said casing being flanged inwardly and upwardly to embrace the edges of said lining.

5. In a machine of the class described, a receptacle for the liquid gum or paste having front and rear cover-plates separated from each other at their inner edges, a gumming-roller mounted in the receptacle and projecting into the space between the inner edges of said plates and a humidifier mounted over said roller and spanning said space, said humidifier consisting of a removable sheet metal casing of inverted trough shape having closed ends and top and downwardly diverging sides and a lining of water-holding substance extending along the inner walls of the sides and top of the casing.

6. In a machine of the class described, a receptacle for the liquid gum or paste having removable front and rear plate cover-sections and substantially central corresponding vertical end-sections extending above the top of the receptacle and recessed at their lower ends at the top of said receptacle to receive the inner edges of said cover-sections, said cover-sections being spaced apart at their inner edges and recessed at the ends of said edges where they enter the recesses at the lower ends of said end-sections, and said cover sections having at their outer edges pins to enter the receptacle and engage the inner walls of the ends thereof, combined with a gumming-roller mounted in said receptacle and projecting into the space between the inner edges of said plates, and a feed-roller coöperating with said gumming roller.

7. In a machine of the class described, in combination, a device for rendering one side of a strip adhesive, a closure for said device, and means other than the adhesive for saturating with moisture the air contained within said closure, thereby preventing the adhesion of said strip to said device.

8. In a machine of the class described, in combination, a tank for material to render the strip adhesive, an applying roll, a closure for the roll having reduced apertures for the passage of the strip, and means for moistening the air contained in said closure.

Signed at New York, in the county of New York, and State of New York, this 29th day of September, A. D. 1913.

ALBERT M. SCHALL.

Witnesses:
ARTHUR MARION,
CHAS. C. GILL.